May 15, 1956 J. A. MELCHORE 2,745,824
PROCESS FOR THE POLYMERIZATION OF STYRENE AND ACRYLONITRILE
Filed June 10, 1953
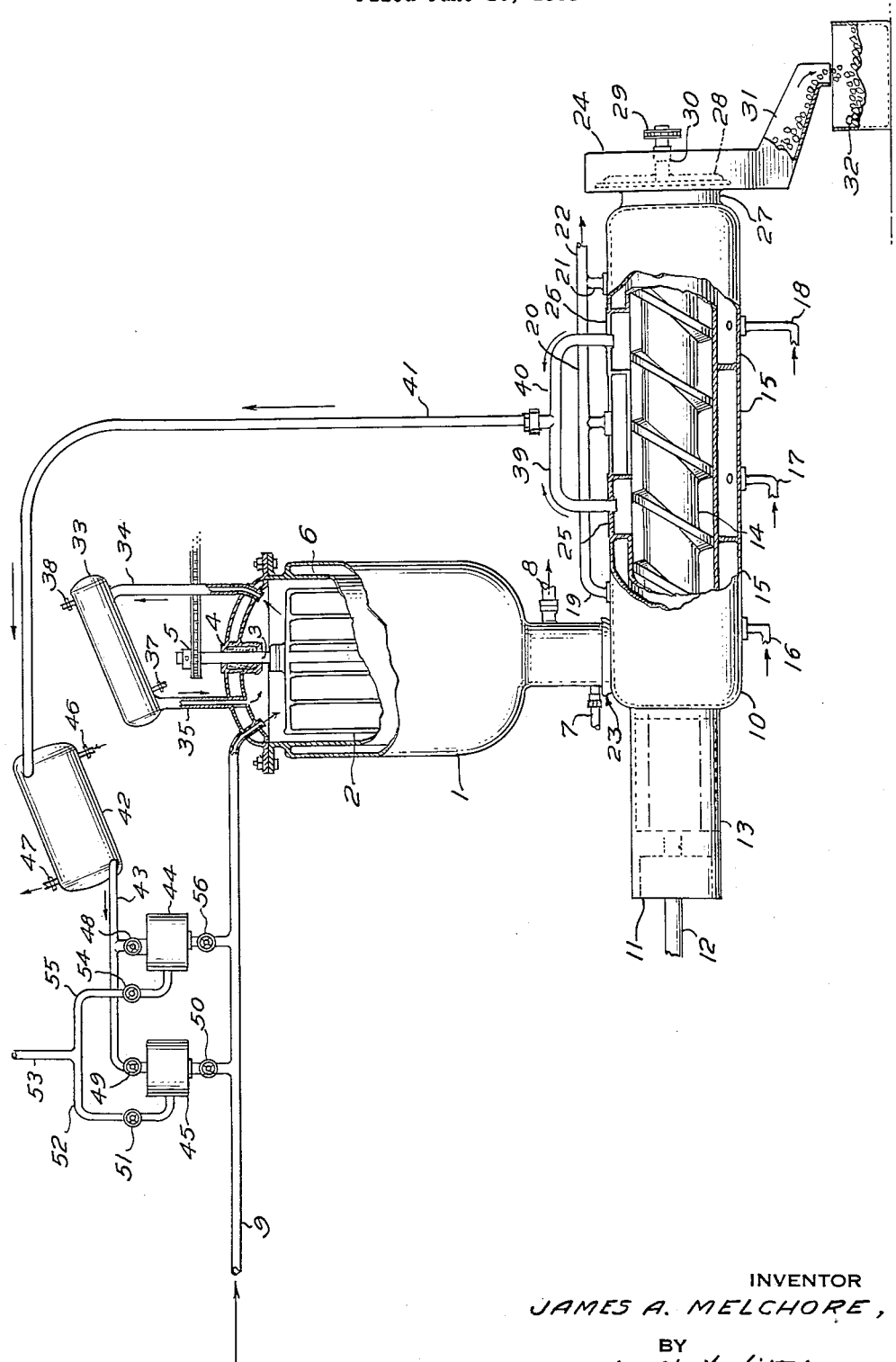
INVENTOR
JAMES A. MELCHORE,
BY
John V. Whittenburg
ATTORNEY

2,745,824
PROCESS FOR THE POLYMERIZATION OF STYRENE AND ACRYLONITRILE

James A. Melchore, Darien, Conn., assignor to American Cyanamid Company, New York, N. Y., a corporation of Maine Application June 10, 1953, Serial No. 360,720

8 Claims. (Cl. 260—85.5)

This invention relates to the polymerization of styrene compounds with acrylonitrile, more particularly this invention relates to the polymerization of styrene compounds with acrylonitrile whereby the product produced consists of greater than 98% polymeric material and is obtained without the employment of elaborate processing apparatus.

It is well know that polymers of styrene compounds find many uses as molded articles, which may be formed by such conventional methods as compression or injection molding, also the molded articles are transparent and possess good impact and tensile strength, as well as good electrical properties. Polymers of styrene compounds and acrylonitrile possess increased flexural strength and heat, chemical and abrasion resistance. It is for this reason that such polymers of styrene compounds and acrylonitrile are desired. Polymers of acrylonitrile have poor color stability at elevated temperatures and in the presence of certain oxidizing catalysts. However, during the polymerization of styrene compounds with acrylonitrile it is difficult to obtain a transparent product of good color when conventional methods of polymerization are employed wherein either a catalyst and/or high temperatures, e. g. greater than 130° C., are utilized to effect greater than 98% conversion. When it is attempted to remove unreacted monomers from polymers of styrene compounds and acrylonitrile by prior art methods, the polymer discolors at the high temperature involved due to the acrylonitrile present. By the process of my invention it is thus possible to obtain a transparent polymer of styrene compounds and acrylonitrile having a good color and consisting of greater than 98% polymeric material. Also, by the process of my invention it is possible to obtain polymers of styrene compounds and acrylonitrile consisting of greater than 98% polymeric material by the utilization of conventional processing apparatus wherein lower processing temperatures may be used. It is an advantage of my invention that the high temperature previously required to obtain greater than 98% polymeric materials is obviated. By carrying out the instant process at lower temperature the discoloration of the polymers experienced when the conversion was extended by prolonged polymerization at elevated temperatures is lessened. A shortened polymerization cycle is also realized. While high conversion may be realized at lower polymerization temperatures by the use of a catalyst, the presence of the catalyst also causes discoloration of the polymers produced. Here polymers of styrene compounds and acrylonitrile may be obtained by utilizing low temperatures throughout the process without the necessity of a conventional catalyst.

In the polymerization of acrylonitrile and the styrene compounds, it is conventional to initiate polymerization in a pot or still wherein the monomers are agitated. The temperature within the prebodying heat pot is usually maintained at temperatures from 80° C. to 130° C. and agitation of the mix by paddles or any other conventional apparatus is necessary to control the exothermic heat of reaction. Since the polymerization is an exothermic reaction, it is necessary to dissipate the heat evolved, otherwise hot spots would develop with resulting runaway temperatures as high as 200° C. or more. The runaway temperatures are to be avoided since dimers, trimers and other objectionable low polymers are formed. The polymerization cannot be carried to completion in the prebody pot since as polymerization progresses the mix becomes increasingly more viscous so that a point is ultimately reached where the stirring apparatus is ineffective and unless elaborate heat exchange equipment for thermo regulation of the charge is employed, the reaction will reach the runaway temperatures above mentioned.

In the prior art various methods have been employed to obtain substantial completion of the polymerization reaction. One method is to prepolymerize the compound such as styrene to approximately 35% conversion. The partially polymerized mix is then introduced into a polymerization tube wherein elaborate heat exchange equipment is employed to regulate the exothermic heat of reaction. The partially polymerized mix is maintained in the polymerization tube for upwards of 50 hours at temperatures varying from 120° C. to 200° C. A product of substantially 95% conversion is obtained which is then run through a devolatilization zone wherein unreacted monomeric material is removed. Another method employed in the prior art is to prebody the material at approximately 125° C. to from 70 to 80% conversion. Elaborate stirring mechanism is required to agitate the viscous mix and avoid the undesirable runaway temperatures as the polymerization progresses and the heat transfer of the polymerizate falls off sharply, particularly beyond 60% conversion. From the prebody still the mix is introduced into a polymerizer tube for a period of hours where elaborate heat exchange equipment is required to control the temperature of polymerization. In the polymerization tube conversion of substantially 95% is possible. It is then usual for the polymerization mix to be milled to remove unreacted monomers.

It is an object of this invention to obtain substantially complete polymerization of styrene compounds with acrylonitrile without the utilization of elaborate polymerization equipment. It is a further object of this invention to eliminate the apparent polymerization exothermic heat of reaction present. These and other objects of the invention will be discussed more fully hereinbelow.

The styrene compounds included within the process definition of my invention are those compounds represented by the following formula:

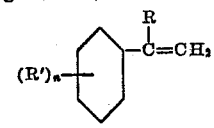

wherein R is selected from the group consisting of hydrogen, chlorine, and methyl radicals, R' is a substituent selected from the group consisting of chlorine and lower alkyl radicals and n is an integer between 0 and 2. Among such compounds are styrene per se, nuclear substituted alkyl styrenes e. g. o-, m-, and p-methyl styrene, 2,4-dimethyl styrene, and the like; nuclear substituted halo styrene, e. g. 2,4-dichlorostyrene, 2,5-dichloro styrene and the like; said chain alkyl and halo substituted styrenes, e. g. alpha-chlorostyrene, alpha-methylstyrene, and the like. Mixtures of the styrene compounds may also be employed if desired. The amount of acrylonitrile that is polymerized with the styrene compound may vary over a rather wide range. Thus, from about 10% to about 40% by weight of acrylonitrile based on the total weight of polymeric materials charged into the reactor may be used. It is preferred, however, that from about 25% to about 30% by weight of acrylonitrile based on the total weight be utilized.

If desired, a conventional polymerization catalyst such as benzoyl peroxide in an amount from about 0.02% to about 2% by weight based on the monomers charged into the reactor may be employed. Other conventional catalysts which may be used are such as tertiary butyl hydroperoxide, tertiary butyl perbenzoate, ditertiary butyl peroxide, lauroyl peroxide and the like. Mixtures of the various catalysts may also be employed. However, the use of a catalyst is not necessary to insure polymerization.

In carrying out the process of this invention a conventional prebody pot is initially employed. A charge of the monomeric compounds to be polymerized, such as styrene and acrylonitrile in a weight ratio of 70/30 respectively, is placed in the pot. Polymerization is initiated at temperatures from 85° C. to 100° C. Agitation of the mix is accomplished by conventional paddles or stirrers. After a period of from 8 to 24 hours in the prebody pot, the mix has reached a conversion of from about 40% to 60%. While it is possible to carry the conversion further in the prebody pot, it is not desirable since the viscosity of the mix is such that agitation thereof becomes increasingly difficult. At this point in the conversion of the monomers the danger of the runaway temperatures with consequent formation of lower unpolymerized products is most apparent. Accordingly, the mixture containing approximately from 40% to 60% solids is then introduced into a twin screw compounding extruder and devolatilizer. The extruder and devolatilizer is sectionally heated from temperatures of about 110° C. to about 190° C. The devolatilization zone of the extruder is also maintained at an absolute pressure of from about 5 to 100 mm. Hg. The temperature of the sectionally heated extruder and devolatilizer is preferably maintained from about 160° C. to about 175° C. and the absolute pressure is preferably maintained at from about 20 to about 40 mm. Hg. As the partially polymerized mix from the prebody pot is introduced into the extruder and devolatilizer, the increased temperature of the extruder causes a devolatilization of the charge and inasmuch as the extruder is maintained at subatmospheric pressures, the unreacted monomeric material is withdrawn from the mix. The partially polymerized charge is passed through the extruder and devolatilizer in a period of from 1 to 3 minutes. The product exiting therefrom consists of greater than 98% polymeric material. It is thus seen by simultaneous extruding and devolatilizing the partially polymerized mix obtained from the prebody pot, the danger of runaway temperatures caused by the exothermic heat of the reaction as the polymer conversion increases upwards from 60% conversion accompanied by sharply increasing viscosity is avoided. Since the heat transfer of styrene polymer alone is approximately 0.07 B. t. u./ft.$^2$/° F./hr./ft., it is seen that dissipation of heat from a highly viscous mass is practically impossible with mere agitation. Conventional equipment is utilized throughout my entire process and the elaborate and intricate heat exchange equipment and agitation equipment previously required are also avoided. The unreacted monomeric compound that is removed from the charge in the devolatilization mill is recycled to the prebody pot. The overall time required for substantially complete conversion of a monomeric compound is thus greatly reduced and conventional nonexpensive equipment is employed throughout the process.

The invention will be better understood by reference to the single figure of the drawing shown partially in section which discloses the equipment utilized in the process. By way of illustration only, the polymerizing of styrene and acrylonitrile will be disclosed, it being understood that other styrene compounds will react equally well in my process.

1 is the prebody pot equipped with a rotatable cage 2, connected to the shaft 3, passing through bushing 4 in the top of the pot and driven by sprocket 5 connected to a motor not shown. The pot is conventionally heated as shown by the jacket 6. The heating fluid such as oil or similar material circulates into the jacket at connection 7 and exits through pipe 8. Styrene monomer and acrylonitrile monomer in a weight ratio of 70/30 are introduced into the pot under pressure through line 9. As the monomers enter the heated pot maintained at a temperature of from 85 to 100° C., the rotating cage 2 agitates the material as it polymerizes. From 40 to 60% conversion occurs in a period of from 8 to 24 hours. The partially polymerized charge is then forced by the pressure applied from the charge and also by gravity through the bottom of the pot into the twin screw devolatilization extruder 10. The sprocket 11 connected to the shaft 12 is rotated by a motor not shown. Shaft 12 extends into housing 13 which contains conventional gearing to cause screw 14 to rotate. In the drawing only one screw is disclosed, but it should be understood that the devolatilization extruder 10 contains twin screws located adjacent one to another. Around the exterior of the devolatilization extruder is a heating jacket divided into sections as indicated by 15. Inlets 16, 17 and 18 allow a heating fluid to circulate in the heating jacket sections of the extruder maintained at temperatures of from 110° C. to 190° C., and the heating fluid is taken off from the heating jacket by connections 19, 20 and 21 connected to pipe 22 which returns the fluid to the heating unit not shown. The charge enters the twin screw extruder through the feed hopper 23 and the polymeric material is removed from the extruder through hood 24. The partially polymerized mass passes from the feed hopper 23 through the extruder wherein the volatiles released due to the elevated temperature of the extruder are taken off through ports 25 and 26. The polymeric material passes out through hood 24 in a period of from one to three minutes after entering the devolatilization extruder. The polymeric mass passes out through the die 27 at the exit end of the extruder and the rotating blade 28 rotated by the sprocket 29 attached to shaft 30, driven by a motor not shown, cuts the polymerized material into pellets 31 which fall out of hood 24 into the container 32. Condenser 33 is connected to the pot 1 by pipes 34 and 35. Any of the vaporous monomers in the upper portion of pot 1 may circulate through pipe 34 through the condenser 33 and return as a liquid to the pot through pipe 35. Pipes 37 and 38 are provided for the circulation of a conventional coolant around the condenser 33. As previously indicated, the volatile material in the twin extruder is removed through ports 25 and 26 by pipes 39 and 40 respectively which connect to pipe 41. Due to the vacuum applied at ports 25 and 26, the volatile material passes up through line 41 to condenser 42 wherein the volatile material is condensed and passes via line 43 to either reservoir 44 or 45. Connections 46 and 47 are provided for circulation of a conventional cooler around condenser 42. Valves 48 and 49 are provided to regulate the flow of the condensed monomers flowing from the condenser 42. When valve 49 is open, valve 48 is closed and vice versa. When vale 49 is open, the condensed monomers would of course flow into reservoir 45. Valve 50 is at this time closed. Valve 51 is at this time open so that a vacuum is drawn through line 52 by a vacuum pump, not shown, connected to line 53. The vacuum applied in line 53 is such that the system through the reservoir, condenser and connecting pipes leading to ports 25 and 26 is from about 5 to 100 mm. pressure absolute. When reservoir 45 becomes full of condensed liquid monomers, valve 48 is open and valve 49 is closed. Simultaneously therewith valve 54 is opened and valve 51 is closed so that the vacuum applied to line 53 will then pass through line 55 to reservoir 44, the condenser 42, line 41 and ports 25 and 26. Valve 56 is closed when the liquid monomers are being drawn into reservoir 44. When reservoir 44 is being utilized to collect the liquid monomers flowing from condenser 42, valve 50 is opened so that the liquid monomers collected in reservoir 45 may flow into line 9 and be recirculated to pot 1. By the manipulation of valves 48, 49, 50, 51, 54 and 56 it is possible to employ either reservoir 44 or 45 for the collection of the condensed volatiles. When one of the reservoirs is being used to collect the condensate, the valve between the other reservoir and line 9 is opened so that the liquid styrene may recirculate to pot 1. Conventional bushings, connections, etc. are applied throughout the system.

The following table is set forth to show the increase of viscosity of the reaction mass as polymerization progresses.

TABLE

*Viscosity at 125° C. centipoise*

| Percent conversion: | Acrylonitrile-styrene (30/70 wt. ratio) |
|---|---|
| 20 | 0.035 |
| 30 | 0.125 |
| 40 | 1.25 |
| 50 | 12.5 |
| 60 | 281 |
| 70 | 10460 |
| 80 | 707000 |

From the above table it is seen that when the conversion of the polymerization mass exceeds approximately 60%, the viscosity of the reaction mass increases so that avoidance of hot spots in the prebody pot by conventional heat exchange equipment is not possible. It is when the percent conversion is approximately 40 to 60% that I introduce the mass into the twin screw devolatilization extruder. By rapidly passing the polymerization mass through the extruder in a period of from 1 to 3 minutes, I have found that elaborate heat exchange equipment is not necessary. The vacuum applied to the devolatilization zone of the extruder removes the volatile material released due to the increased temperature in the extruder and a product of greater than 98% polymeric material is recovered from the extruder. By recycling the volatiles to the prebody pot no material is lost in the process. An efficient economic process carried out with conventional non-elaborate heat exchange equipment is thus possible.

The following table is set forth in order to illustrate the efficiency of my invention in obtaining a polymerized product containing greater than 98% polymeric material by simultaneously extruding and devolatilizing the partially polymerized charge. The figures set forth below are for the purpose of illustration, not limitation, unless otherwise noted in the appended claims.

| S/AN [1] Chg. | Extrusion Temp., °C. | Devolatilization Press., mm. Hg | Retention time, Min. | Percent Residue Monomers | M. W. |
|---|---|---|---|---|---|
| 70/30 | 170 | 20 | 2 | 0.60 | 72,400 |
| 70/30 | 175 | 20 | 1.5 | 1.6 | |

[1] Styrene-acrylonitrile weight ratio.

The partially polymerized charge introduced into the extruder and devolatilizer contains from about 40% to about 60% solids. By carrying the polymerization to this range in the prebody pot a polymerization time of about 8 hours is usually sufficient. If desired, the polymerization time may be extended to about 24 hours when lower polymerization temperatures are utilized. When the partially polymerized charge containing from about 40% to about 60% solids is removed from the prebodying pot, the danger caused by the exothermic temperature increasing as the percentage of polymerization increases is obviated, also, the great increase in viscosity of the charge further polymerizing in the prebody pot is eliminated. Therefore, a conventionally stirred prebodying pot may be utilized to carry the polymerization to this point without employing elaborate heat transfer means. The time that the partially polymerized charge is maintained in the devolatilization extruder is from about 1 minute to about 3 minutes. By controlling among other things, the speed of revolution of the screws, the design, the die through which the material is extruded, the retention time of the material in the devolatilization extruder may be determined. Inasmuch as the charge is maintained at an elevated temperature in the devolatilization extruder, the unreacted monomers are volatilized and removed due to the subatmospheric pressure maintained. The overall time required to obtain a polymerized product of styrene compounds and acrylonitrile is thus greatly reduced. The polymerized product prepared in accordance with my invention is of good color, transparent and contains greater than 98% polymeric material.

This application in a continuation-in-part of my application Serial No. 322,615, filed November 26, 1952, now abandoned.

I claim:

1. A process for producing a thermoplastic resinous material which comprises the polymerization of a mixture comprising from about 90% to about 60% by weight of a compound represented by the general formula

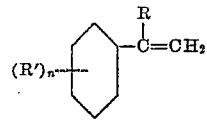

wherein R is selected from the group consisting of hydrogen, chlorine and methyl radicals, R' is a substituent selected from the group consisting of chlorine and lower alkyl radicals and $n$ is an integer between 0 and 2, and from about 10% to about 40% by weight of acrylonitrile in bulk at a temperature of from about 85° C. to about 120° C. until a conversion to approximately 40% to 60% polymeric material is obtained, passing said partially polymerized material and unreacted monomeric material through a zone maintained at a temperature between about 110° C. and about 190° C. and at an absolute pressure of less than 100 mm. mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

2. A process for producing a thermoplastic resinous material which comprises the polymerization of a mixture comprising from about 75% to about 70% by weight of a compound represented by the general formula

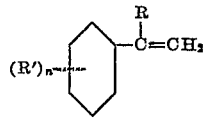

wherein R is selected from the group consisting of hydrogen, chlorine and methyl radicals, R' is a substituent selected from the group consisting of chlorine and lower alkyl radicals and $n$ is an integer between 0 and 2, and from about 25% to about 30% by weight of acrylonitrile in bulk at a temperature of from about 85° C. to about 120° C. until a conversion to approximately 40% to 60% polymeric material is obtained, passing said partially polymerized material and unreacted monomeric material through a zone maintained at a temperature between about 160° C. and 175° C. and at an absolute pressure of less than 100 mm. mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

3. A process for producing a thermoplastic resinous material which comprises the polymerization of a mixture comprising from about 90% to about 60% by weight of styrene and from about 10% to about 40% by weight of acrylonitrile in bulk at a temperature of from about 85° C. to about 120° C. until a conversion to approximately 40% to 60% polymeric material is obtained, passing said partially polymerized material and unreacted monomeric material through a zone maintained at a temperature between about 110° C. and about 190° C. and at an absolute pressure of less than 100 mm. mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

4. A process for producing a thermoplastic resinous material which comprises the polymerization of a mixture comprising from about 75% to about 70% by weight of styrene and from about 25% to about 30% by weight of acrylonitrile in bulk at a temperature of from about 85° C. to about 120° C. until a conversion to approximately 40% to 60% polymeric material is obtained, passing said partially polymerized material and unreacted monomeric material through a zone maintained at a temperature between about 160° C. and about 175° C. and at an absolute pressure of less than 100 mm. mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

5. A process for producing a thermoplastic resinous material which comprises the polymerization of a mixture comprising from about 90% to about 60% by weight of a compound represented by the general formula

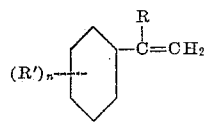

wherein R is selected from the group consisting of hydrogen, chlorine and methyl radicals, R' is a substituent selected from the group consisting of chlorine and lower alkyl radicals and $n$ is an integer between 0 and 2, and from about 10% to about 40% by weight of acrylonitrile in bulk at a temperature of from about 85° C. to about 100° C. until a conversion to approximately 40% to 60% polymeric material is obtained, passing said partially polymerized material and unreacted monomeric material through a zone maintained at a temperature between about 110° C. and about 190° C. and at an absolute pressure of from about 20 to 40 millimeters mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

6. A process for producing a thermoplastic resinous material which comprises the polymerization of a mixture comprising from about 75% to about 70% by weight of a compound represented by the general formula

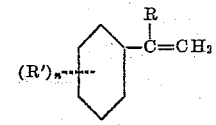

wherein R is selected from the group consisting of hydrogen, chlorine and methyl radicals, R' is a substituent selected from the group consisting of chlorine and lower alkyl radicals and $n$ is an integer between 0 and 2, and from about 25% to about 30% by weight of acrylonitrile in bulk at a temperature of from about 85° C. to about 100° C. until a conversion to approximately 40% to 60% polymeric material is obtained, passing said partially polymerized material and unreacted monomeric material through a zone maintained at a temperature between about 160° C. and 175° C. and at an absolute pressure of from about 20 to 40 millimeters mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

7. A process for producing a thermoplastic resinous material which comprises the polymerization of a mixture comprising from about 90% to about 60% by weight of styrene and from about 10% to about 40% by weight of acrylonitrile in bulk at a temperature of from about 85° C. to about 100° C. until a conversion to approximately 40% to 60% polymeric material is obtained, passing said partially polymerized material and unreacted monomeric material through a zone maintained at a temperature between about 110° C. and about 190° C. and at an absolute pressure of from about 20 to 40 millimeters mercury in a period of from 1 to 3 minutes while simultaneously extruding the polymeric material and devolatilizing the unreacted monomeric material therefrom, separately withdrawing the volatilized unreacted material and the extruded polymeric material from the zone, recycling the unreacted monomeric material recovered from the zone to the bulk polymerization mixture, and cooling the substantially completely polymerized material containing greater than 98% polymeric material.

8. A process for producing a thermoplastic resinous material which comprises the polymerization of a mixture comprising from about 75% to about 70% by weight of styrene and from about 25% to about 30% by weight of acrylonitrile in bulk at a temperature of from about 85° C. to about 100° C. until a conversion to approximately 40% to 60% polymeric material is obtained, passing said partially polymerized material and unreacted monomeric material through a zone maintained at a temperature between about 160° C. and about 175° C. and at an absolute pressure of from about 20 to 40 millimeters mercury in a period of from 1 to 3 minutes while simultaneously extruding the polymeric material and devolatilizing the unreacted monomeric material therefrom, separately withdrawing the volatilized unreacted monomeric material and the extruded polymeric material from the zone, recycling the unreacted monomeric material recovered from the zone to the bulk polymerization mixture, and cooling the substantially completely polymerized material containing greater than 98% polymeric material.

References Cited in the file of this patent

UNITED STATES PATENTS 2,530,409    Stober et al.      Nov. 21, 1950

FOREIGN PATENTS 590,247    Great Britain      July 11, 1947